United States Patent

Fearnside

[11] 4,135,215
[45] Jan. 16, 1979

[54] VIDEO RECORDING FORMAT FOR INCREASING TRACK-TO-TRACK CORRELATION

[75] Inventor: William T. Fearnside, Fishers, N.Y.
[73] Assignee: Eastman Kodak Company, Rochester, N.Y.
[21] Appl. No.: 818,254
[22] Filed: Jul. 22, 1977
[51] Int. Cl.² .................... G11B 21/10; H04N 5/78
[52] U.S. Cl. .................................................. 360/70
[58] Field of Search .................. 360/33, 70, 69, 75, 360/84, 85

[56] References Cited

U.S. PATENT DOCUMENTS

| 3,157,739 | 11/1964 | Okamura | 360/33 |
| 3,215,772 | 11/1965 | Kihara | 360/33 |
| 3,234,325 | 2/1965 | Backers et al. | 360/33 |
| 3,643,012 | 2/1972 | Clark et al. | 360/70 |

Primary Examiner—Bernard Konick
Assistant Examiner—Donald McElheny
Attorney, Agent, or Firm—Thomas H. Close

[57] ABSTRACT

In using helical-scan-type apparatus for recording video information in parallel tracks on magnetic tape, the typical slanted arrangement of the tracks results in track-to-track shifting or offset. Tape scanning apparatus adapted for implementing an improved recording technique employs an incremented scanning head speed for scanning one track in a period of time that departs from the period of one video signal sequence (e.g. a video field or frame) by an amount that is specially selected in accordance with the track offset. By so incrementing the scanning head speed the position of a video signal sequence within a track is shifted with respect to the signal sequences in adjacent tracks in a manner that compensates for the offset and provides a closer correlation between the video signal in adjacent tracks, thereby minimizing the effects of cross-talk between tracks.

8 Claims, 6 Drawing Figures

VIDEO RECORDING FORMAT FOR INCREASING TRACK-TO-TRACK CORRELATION

DESCRIPTION RELATIVE TO THE PRIOR ART

1. Field of The Invention

The invention relates generally to magnetic video recording. More particularly, the invention relates to video recording formats for reducing objectionable interference between video signals recorded in adjacent tracks and to apparatus for producing video recordings according to such formats.

2. Background of The Invention

In video recording, one characteristic of great concern is the density of information storage on the recording medium (typically magnetic tape). This concern arises, in part, because of the cost of magnetic tape, but is reinforced by a desire to provide reasonably compact tape cassettes for extending recording intervals.

One possibility for increasing recording densities is to reduce or eliminate the guard bands that are generally provided between tracks. A problem with reducing guard bands arises, however, because magnetic interference ("cross talk") between tracks increases as the tracks are arranged closer together. Indeed, the main purpose for introducing guard bands is to reduce crosstalk noise.

Various techniques have been developed to reduce cross-talk effects and thereby permit a reduction in track spacing. One such technique calls for alignment of the horizontal sync signals in adjacent tracks so that such sync signals are not arranged adjacent to recorded signals representing picture information (see, e.g., U.S. Pat. Nos. 3,234,325 and 3,215,772). Such H-sync alignment, as it is often called reduces the noticeability of cross talk because the sync signals, which are typically recorded as strong magnetic fields, do not occur alongside portions of the video signal representing picture information, which latter are relatively susceptible to corruption by noise.

For recorders using more than one head, it is known to orient the individual head gaps in different directions relative to the track direction in order to reduce magnetic coupling from adjacent tracks (see, e.g., U.S. Pat. No. 3,925,816). By varying head orientation, say on an alternate track basis, the magnetic influence of adjacent tracks on the playback heads is reduced. The playback heads must, however, have orientations corresponding to those of the recording heads and must be synchronized to sweep correspondingly oriented tracks.

Different frequency ranges may be recorded in adjacent tracks to reduce cross talk, but in so doing useable track bandwidth is decreased (see, e.g., U.S. Pat. No. 3,925,816). With this technique selective filtering would generally be employed to remove components (noise) in the reproduced signal which have frequencies within the frequency range for the adjacent tracks.

U.S. Pat. No. 3,821,787 describes a technique for reducing cross talk by selectively blanking track segments so that signal-bearing track segments occur between blank segments of adjacent tracks. The missing signals are then replaced on playback by signals based on recorded signals which would be expected to be similar.

While, as is indicated above, various techniques do exist for reducing track-to-track magnetic interference each has some shortcomings, and new approaches to reducing cross-talk effects are needed.

SUMMARY OF THE INVENTION

Rather than operate the head wheel of a helical scan recorder at a rotational speed S to record one video signal sequence (e.g., a frame or field) per track as is customary, a specially selected increment in speed is introduced. Such increment is selected, as is explained more fully below, in accordance with the offset or shift to adjacent tracks which results with the slanted track arrangement produced by, for example, helical scan recorders.

By introducing such a speed increment, the position of a video signal sequence in a track is shifted with respect to signal sequences in adjacent tracks by an amount corresponding to the track offset with the result that the video signal recorded in adjacent tracks is highly correlated, i.e., sync signals occur side by side in adjacent tracks and corresponding picture information, from corresponding areas in consecutive frames or fields, occurs side-by-side in adjacent tracks. The invention recognizes that such high correlation decreases the objectionability of track-to-track cross talk, particularly where such cross talk reveals itself as imagewise or coherent interference as would be the case for recordings using phase modulation or AC bias recording.

By practicing the invention, it turns out that a further desirable result occurs, viz. the regularly occuring vertical sync signals of, say, a standard NTSC signal are caused to be in a generally side-by-side arrangement in adjacent tracks and therefore do not occur alongside recorded picture information where noticeable interference is more likely.

A head-wheel apparatus for implementing a head speed that is incremented according to the invention preferably uses a head wheel drive motor which is included in a phase-lock feedback loop having a fixed-frequency oscillator for a reference. An inductive-type encoder detects instantaneous head wheel angle and the encoder output signal is compared to the phase of the oscillator signal. To achieve operation according to the invention, the oscillator frequency is chosen to correspond to the specially incremented head speed as is explained below. The encoder also controls switching of the heads for the preferred configuration having two heads.

The invention will now be described in detail with reference to the drawings, wherein.

Figure 1A:
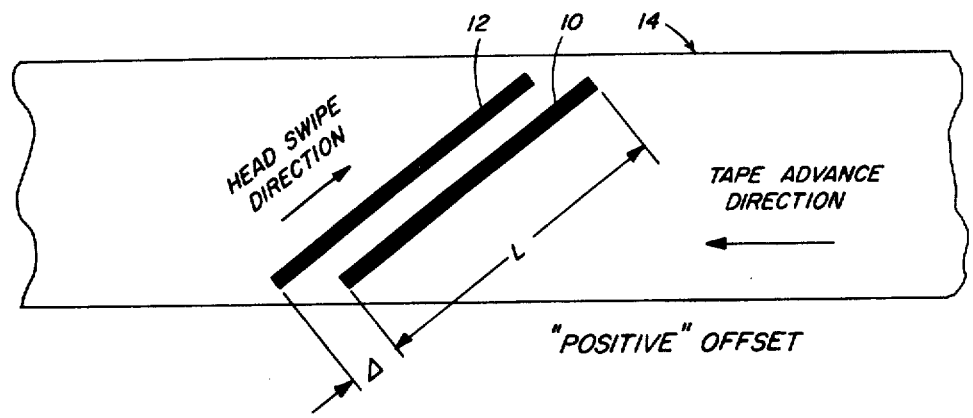
FIGS. 1A and 1B are diagrams for indicating arrangements of tracks (shown as lines) on a magnetic tape.
Figure 1B:
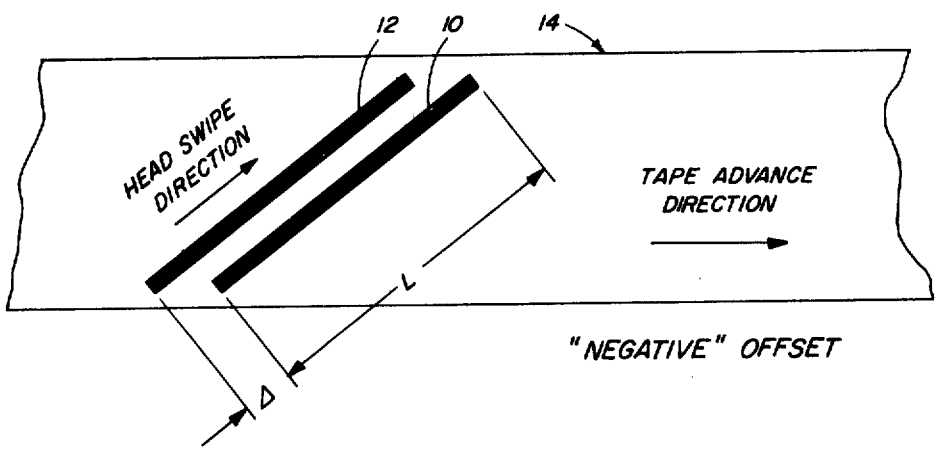

Referring to FIGS. 1A and 1B, two adjacent tracks 10 and 12 slant across a tape 14 and, because such tracks are oblique relative to the longitudinal axis of the tape, a relative track-to-traxck shifting, or offset (denoted Δ) occurs. Such slanting of tracks with resultant offset is, as was mentioned above, typical of the recording formats produced by helical scan recorders.

As indicated in FIG. 1A, the head velocity includes a component opposite the direction of tape advance and for such operation the offset Δ is taken to be positive; i.e., the leading end of a subsequent track is ahead of the leading end of the preceding track. For FIG. 1B, the head velocity has a component in the direction opposite the direction of tape advance and for such operation the offset Δ is herein taken to be negative; i.e., the head must travel the distance Δ in a subsequent track before arriving at the leading end of the preceding track.

Figure 2:
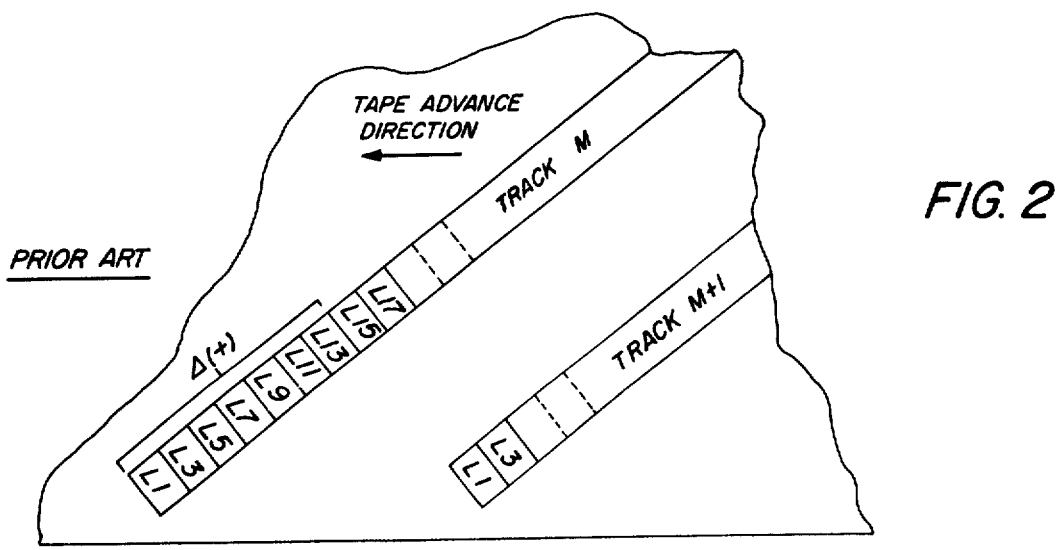
FIG. 2 is a diagram for indicating a relative arrangement of video signals in adjacent tracks which is typical of prior art recording formats.

An example of the effect of a track offset on the locations of video signals in adjacent tracks (assuming one video frame per track), is indicated in FIG. 2, where the numbers preceded by the letter L indicate the lines comprising a frame. Because of the track offset (an offset distance corresponding to seven lines is illustrated) line 1 recorded in track M+1 is alongside line 15 recorded in track M.

Figure 3:
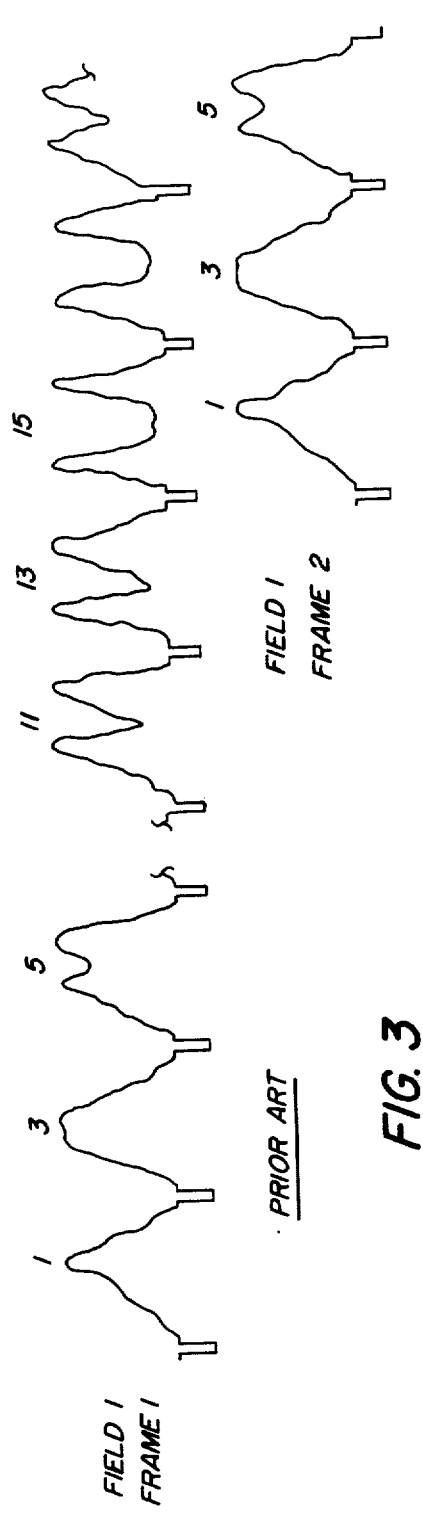
FIG. 3 is a diagram that indicates the character of adjacent video signals with the usual prior art recording formats.

Referring to FIG. 3, graphical representations of bias recorded video signals are indicated for two adjacent tracks, assuming the use of helical scan recording with the prior art H-sync alignment mentioned in the prior art discussion above. Widely separated lines are arranged alongside one another using such technique, and little track-to-track signal correlation can be expected because of signal changes introduced by vertical detail in the original image.

Figure 4:
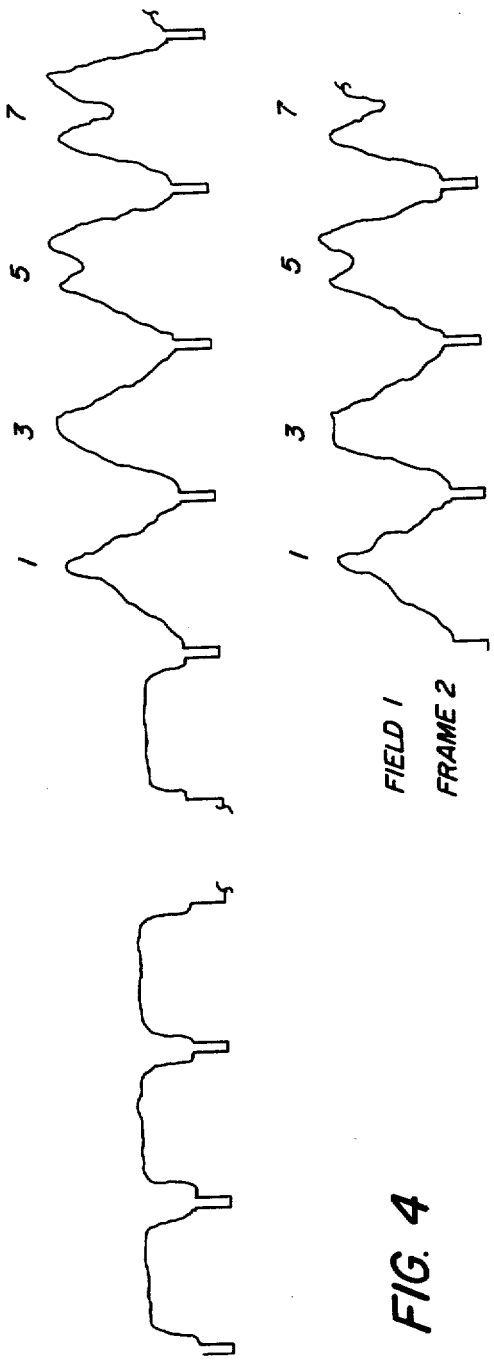
FIG. 4 is a diagram that indicates the character of adjacent video signals with a recording format according to the invention.

The present invention involves the introduction of a specially selected head speed increment (i.e. increment relative to the speed for recording one video signal sequence, say a frame, in one track length) to increase the correlation of the video signal in adjacent tracks (see FIG. 4). An incremented head speed $S'_h$ is selected so that a video signal sequence, say, for a frame recorded in one track length, minus the offset distance. Hence, for a positive offset Δ (see discussion above) the incremented head speed ($S'_h$) is chosen to cause the head to travel a distance of less than a track length in one signal sequence period, e.g. a frame period. Therefore slightly more than one full video signal sequence will be recorded in each track. When the first portion of a video signal sequence has been recorded in the end part of one track, the remaining portion of the sequence will be recorded in the beginning part of the next track. Thus it will be seen that portions of the video signal representing picture information from corresponding areas in consecutive frames or fields will occur side-by-side in adjacent tracks resulting in a high track-to-track signal correlation. See FIG. 1A and 1B and equation 1 below:

$$S'_h = L - \Delta/T \qquad \text{Equation 1}$$

where
L = Track Length and
T = one signal sequence period

For a negative offset the distance Δ has a negative value in Equation 1; and a head speed is so selected as to cause the head to travel more than one track length during a signal sequence period. Therefore slightly less than one full video signal sequence will be recorded in each track. The remaining portion of the signal sequence will be recorded at the beginning part of the next track. Thus, as for the case described above relating to positive offset, portions of the video signal representing picture information from corresponding areas in consecutive frames or fields will occur side-by-side in adjacent tracks.

Preferably the incremented head speed $S'_h$ is chosen so that, as indicated in Equation 2 below, an integer number (say, N) of lines more or less than the number of lines in one video signal sequence are recorded to each track so that a transfer from one track to the next does not occur within a line where switching of the video signal is more likely to result in the introduction of objectionable artifacts.

$$N = \Delta/S'_h \times H \qquad \text{Equation 2}$$

where
H = Δ wherein seven lines may be recorded at the incremented head speed $S'_h$ one line-scan time interval (63.5 μ sec for the standard NTSC format) and N is an integer.

As discussed above, both fields of an interlaced format are included in one video signal sequence, i.e. a full frame is recorded in the sequence distance. To extend the technique to permit each field of an interlaced field format to define a separate video signal sequence, i.e. to record approximately one field per track, the usual half-line shift from one field to the next with the standard video signals must be allowed for. Such allowance may be effected by either over- or under-incrementing the scanning head speed, or by shifting the tracks back and forth by one-half line; e.g. by positioning the heads of a two-head recorder to be on different diameters separated by an angle corresponding to half a line as is described in U.S. Pat. No. 3,376,383. With either approach, the signals recorded in adjacent tracks will be highly correlated.

Figure 5:
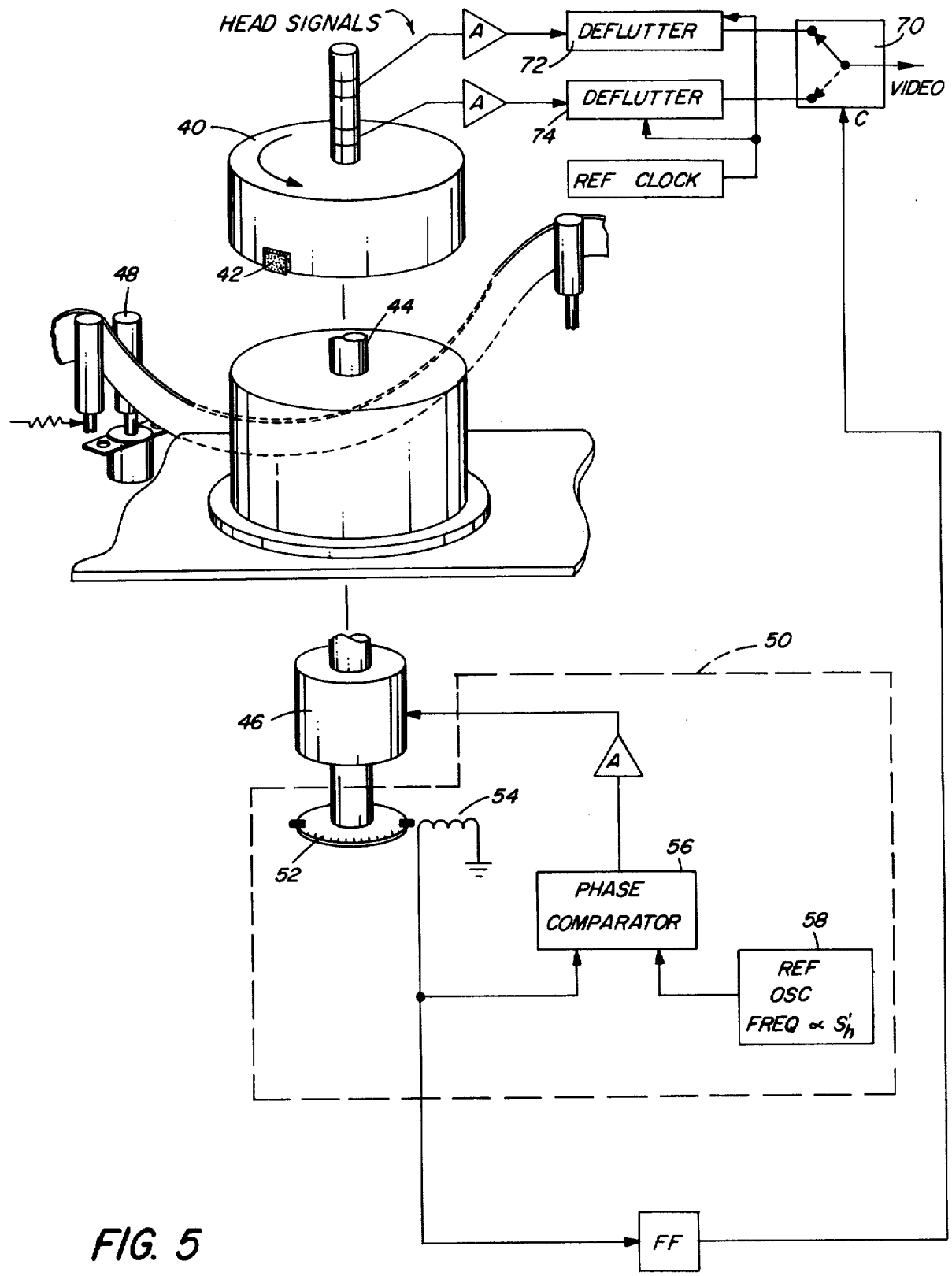
FIG. 5 is a perspective drawing of a presently preferred head drum apparatus for implementing the invention.

Referring now to FIG. 5, a preferred head drive apparatus for use in recorders according to the invention includes a head wheel 40 which carries a pair of opposed magnetic heads (one head denoted 42 is visible in FIG. 5). The head wheel 42 is rotated on a shaft 44 by a drive motor 46 and the heads swipe across a tape 60 to produce slanted parallel tracks as the tape is advanced along a path by means including a capstan 42, as is well known in the art.

Speed control to provide a specially incremented head speed according to the invention is maintained by means of a phase-locked activating circuit 50. An encoder disc 52 including two opposed permanent magnets cooperates with a transducer 54, such as a pickup coil, to prouce pulses related to head position. Such pulses are amplified and are compared at a phase comparator 56 to the output signal of a fixed frequency oscillator 58. The output signal of the phase comparator 56 is then used to activate the motor 46.

With such apparatus 50, the frequency of oscillator 58 is chosen to correspond to a special head speed according to the invention as discussed above. If the head movement has a component in the direction of tape advance (see FIG. 1B), then the offset is taken to be negative, as was discussed above, and the head speed will be increased, i.e., one video signal sequence will extend over more than one track. An increased head speed and requires a higher oscillator frequency than would be required to one record video signal sequence pre-track.

For example, assuming the use of a video signal according to the NTSC format with a video signal sequence representing a frame consisting of 525 lines requiring 1/30 of a second to record and assuming tracks with a negative offset time for recording one, the track according to the invention would be (525-7)/525 × 1/30. With the encoder 52 (FIG. 5) which provides one pulse per track, the oscillator frequency would be:

$$\frac{1}{\frac{525-7}{525} \times (\frac{1}{30})} \approx 30.405 \text{ pulses/sec}$$

The same or a similar speed-controlled apparatus is used for playback. Preferably the signal from the transducer 54 controls switching of the head signals to an output channel by means of a signal controlled gate 70. it is also desirable to provide for time base correction of the signals prior to switching by locating individual defluttering circuits 72 and 74 ahead of the gate 70.

The invention has been described in detail with reference to the figures. However, it will be appreciated that variations and modifications are possible within the spirit and scope of the invention. For example, a head drum having other than two heads may be employed. Also, various tachometer devices for indicating head speed may be employed. And various single or multiple video signal sequence formats may be recorded and may include interlace. Also, any tape medium and recording format which suffers from a tendency for track-to-track cross-talk and exhibits track-to-track offsets could benefit from the invention, e.g. a medium on which information is stored as changes in a reflection characteristic, and which may produce cross talk.

What is claimed is:

1. A video tape bearing recorded video signals in parallel tracks of similar length that are slanted with respect to the tape longitudinal axis, such tracks having a track-to-track offset Δ, said offset being positive or negative depending on whether said tracks slant toward or away from, respectively, the direction of tape advance for recording or playing back the signals, said video signals being composed of successive video signal sequences which include sync information along with picture information, said video signal sequences representing successive video fields or frames, such sync and picture information occurring periodically during said signal sequences, characterized by: said video signals being arranged in said tracks according to a format in which a video signal sequence occupies a distance equal to one track length minus said offset Δ; slightly more or less than one full video signal sequence being recorded in one track length, depending upon whether said offset Δ is positive or negative, respectively, the remainder of a video signal sequence recorded near the end of one track being recorded near the beginning of the next track, thereby causing the video signal recorded in adjacent tracks to be highly correlated, i.e. sync information is arranged side-by-side in adjacent tracks and picture information representing corresponding picture detail in cnsecutive video fields or frames is arranged side-by-side in adjacent tracks, hence minimizing the effects of track-to-track cross-talk.

2. A video tape according to claim 1 wherein the video signal sequences respectively further include vertical sync information occurring at a fixed interval within said respective video signal sequences, said vertical sync information being disposed generally side-by-side in adjacent tracks, thereby causing such vertical sync information to be highly correlated from track-to-track.

3. A video tape according to claim 2 wherein said video signal sequences are composed of a plurality of lines of picture information representing at least one video field, each of said lines being preceded by a regularly occurring horizontal sync signal which identifies the start of a horizontal line.

4. A video tape according to claim 3 wherein alternating video signal sequences representing two distinct types of video field that are relatively shifted by one-half line from one another, the video signal sequences recorded in said tracks being likewise relatively shifted by one-half line in said tracks, whereby the video signal in adjacent tracks is highly correlated, thereby minimizing the effects of track-to-track cross-talk.

5. A video tape according to claim 2 wherein the recorded signals are in the form of magnetic field patterns which are AC bias recorded.

6. In apparatus for recording a video signal on a magnetic tape in parallel tracks of equal length that are slanted with respect to the longitudinal tape axis and are arranged with a track-to-track offset (Δ), said offset being positive or negative depending on whether said tracks slant toward or away from, respectively, the direction of tape advance for recording the video signal, the video signal being composed of successive video signal sequences representing video frames or fields, the apparatus having:
 (a) scanning means including rotatable means carrying at least one recording head;
 (b) means for applying the video signal to said recording head; and
 (c) means for advancing the recording tape past said scanning means to be influenced by said head for recording said video signal in such parallel tracks;
the improvement comprising:
 means for rotating said rotatable means at a specially selected speed so that a video signal sequence is recorded in a distance equal to one track length minus the offset distance Δ; whereby when said offset is positive or negative, slightly more or slightly less than one video signal sequence, respectively, will be recorded in one track length, the remainder of a video signal sequence partially recorded near the end of one track being recorded near the beginning of the next track, thereby causing the video signal recorded in adjacent tracks to be highly correlated, i.e. sync information is arranged side-by-side in adjacent tracks and picture information representing corresponding picture detail in consecutive video fields or frames is arranged side-by-side in adjacent tracks, hence minimizing the effects of track-to-track cross-talk.

7. An apparatus according to claim 6 wherein said means for rotating includes a drive motor coupled to said rotatable means, and means for slaving the speed of said motor to a reference frequency corresponding to said specially selected speed.

8. The apparatus of claim 7 wherein said means for slaving comprises a phase-lock loop comprising a tachometer coupled to said rotatable means, a fixed frequency oscillator operating at a frequency corresponding to the specially selected speed, a phase detector for comparing the frequencies of the outputs of said tachometer and said oscillator, and means for applying the output of said phase detector to said motor.

* * * * *